Figure 1:
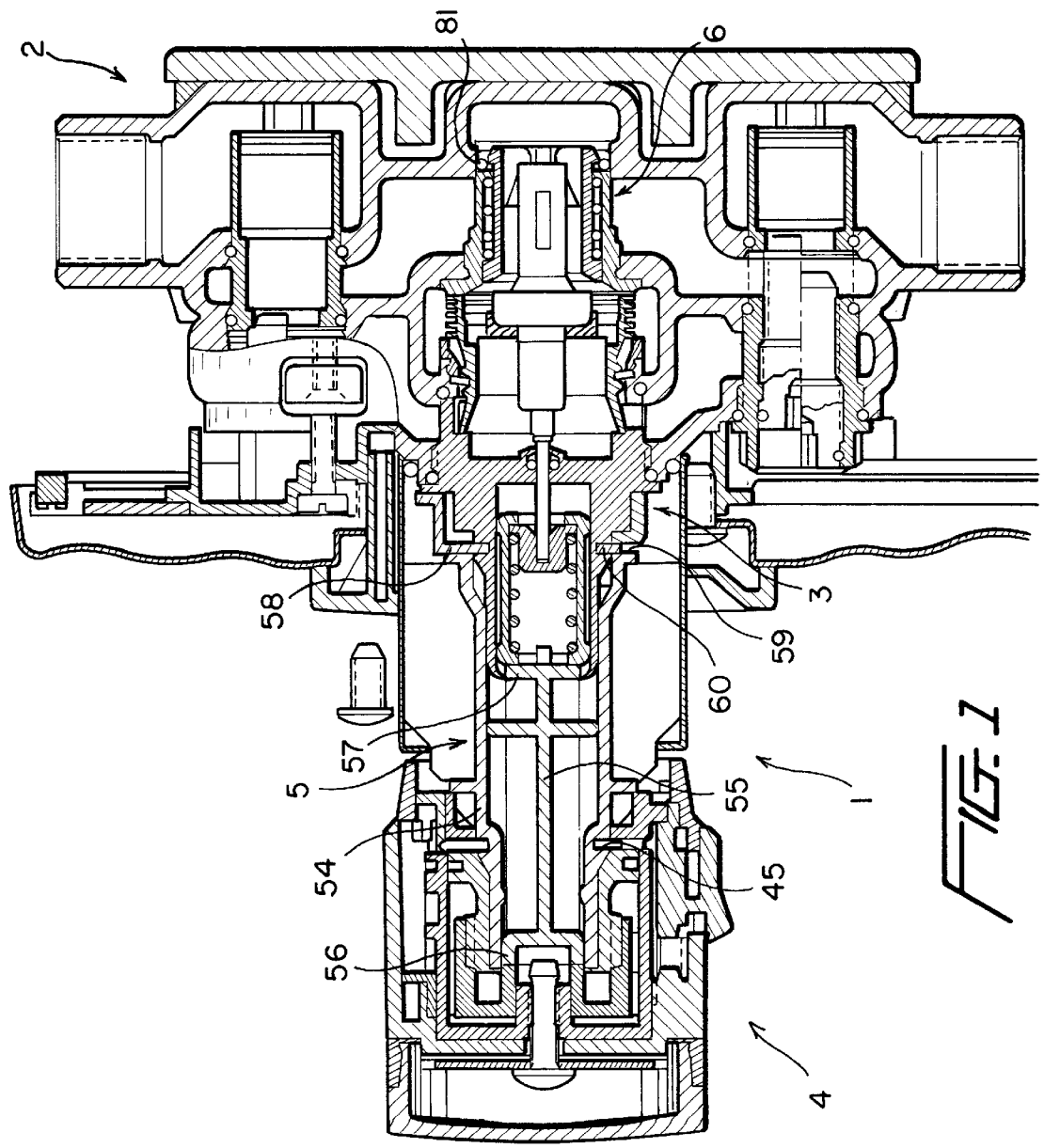

United States Patent
Ems

[11] Patent Number: 5,979,777
[45] Date of Patent: Nov. 9, 1999

[54] SANITARY MIXER TAP WITH A THERMOSTATIC DEVICE

[75] Inventor: Josef Ems, Wittlich, Germany

[73] Assignee: Ideal-Standard GmbH, Bonn, Germany

[21] Appl. No.: 08/875,343

[22] PCT Filed: Jan. 24, 1996

[86] PCT No.: PCT/EP96/00276

§ 371 Date: Oct. 17, 1997

§ 102(e) Date: Oct. 17, 1997

[87] PCT Pub. No.: WO96/23157

PCT Pub. Date: Aug. 1, 1996

[30] Foreign Application Priority Data

Jan. 25, 1995 [DE] Germany ............ 195 02 147

[51] Int. Cl.⁶ .................................................. G05D 23/13
[52] U.S. Cl. ........................ 236/12.2; 236/42; 236/100
[58] Field of Search ................... 236/12.2, 42, 93 R, 236/93 A, 99 K, 100

[56] References Cited

U.S. PATENT DOCUMENTS

| | | | |
|---|---|---|---|
| 3,685,728 | 8/1972 | Chapou | 236/12.2 |
| 3,765,604 | 10/1973 | Trubert et al. | 236/100 |
| 3,955,759 | 5/1976 | Knapp | 236/12.2 |
| 4,607,788 | 8/1986 | Vendall et al. | 236/12.2 |
| 5,205,483 | 4/1993 | Kostorz | 236/12.2 |
| 5,230,465 | 7/1993 | Kostorz et al. | |
| 5,242,108 | 9/1993 | Heimann et al. | |
| 5,344,067 | 9/1994 | Axelsson et al. | 236/12.2 |

FOREIGN PATENT DOCUMENTS

| | | |
|---|---|---|
| 0 461 536 | 12/1991 | European Pat. Off. . |
| 0 530 471 | 3/1993 | European Pat. Off. . |
| 0 552 452 | 7/1993 | European Pat. Off. . |
| 15 50 412 | 9/1969 | Germany . |
| 7421876 | 9/1974 | Germany . |
| 28 52 935 | 6/1980 | Germany . |
| 80 24 065 | 12/1980 | Germany . |
| 33 00 600 | 7/1983 | Germany . |
| 42 06 703 | 9/1993 | Germany . |
| 93 09 447 | 10/1993 | Germany . |
| 42 25 175 | 2/1994 | Germany . |
| 643 928 | 6/1984 | Switzerland . |

*Primary Examiner*—William E. Tapolcai
*Attorney, Agent, or Firm*—Sixbey, Friedman, Leedom & Ferguson; David S. Safran

[57] ABSTRACT

The invention is a sanitary mixer tap with a thermostatic device (1), especially for wall installation, with a thermostat cartridge (3) containing an overtravel unit (9). This unit (9) contains a sleeve (14), at least one pressure spring (15) and at least one pressure component (16) against which the pressure spring (15) acts. At each of its ends the sleeve (14) has a stop (19, 20). One stop (19) at least indirectly takes the thrust of the pressure component (16), the other stop (20) at least indirectly takes the thrust of the pressure spring (15). In order to achieve a simpler and cheaper construction design for the overtravel unit (9) without operational drawbacks, the sleeve (14) can be folded back on the overtravel unit (9) when it is not mounted and both stops (19, 20) will be presented before the pressure spring (15) and the pressure component (16) are inserted.

33 Claims, 4 Drawing Sheets

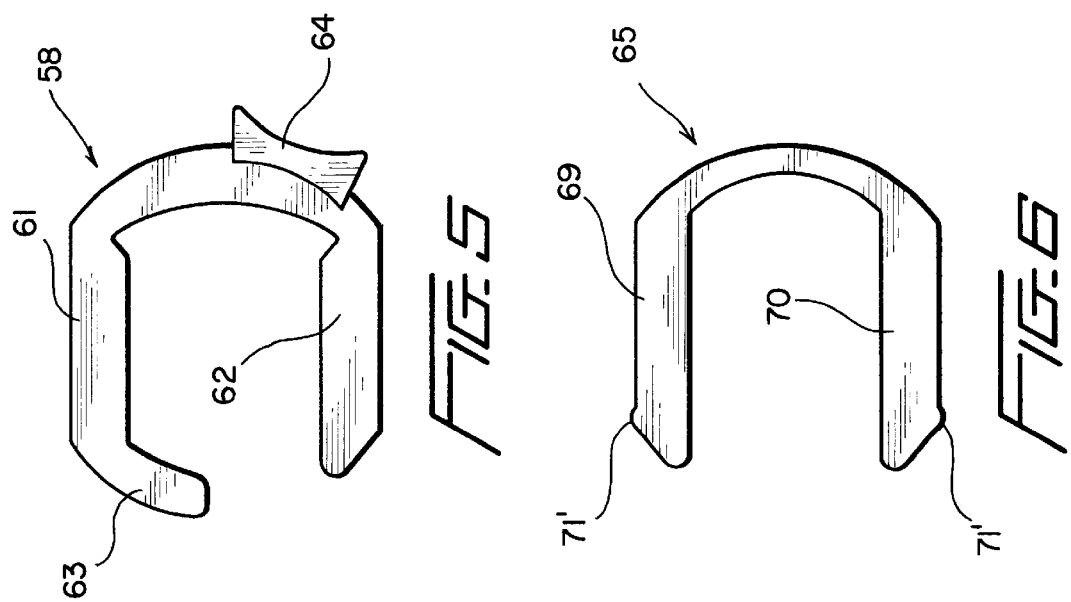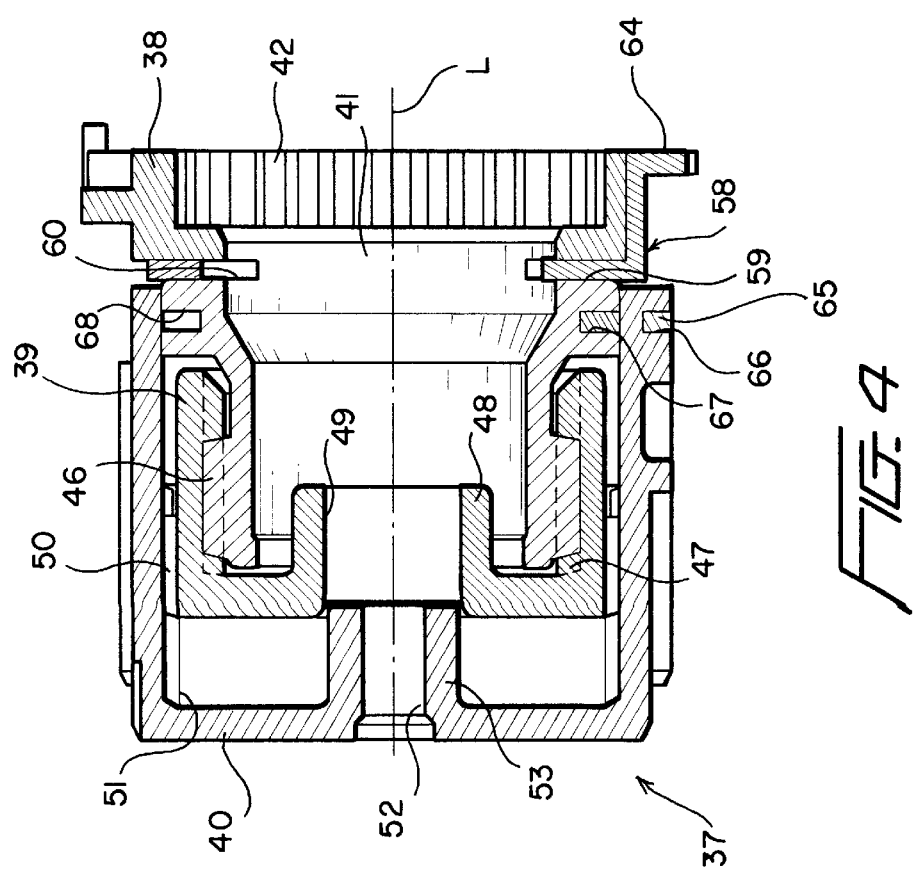

SANITARY MIXER TAP WITH A THERMOSTATIC DEVICE

The invention relates to a sanitary mixing faucet with a thermostat device, with a thermostat cartridge which has an overtravel unit, the latter having a sleeve body, at least one compression spring element and at least one thrust piece against which the compression spring element acts, the sleeve body in the area of its two ends having one stop each, and one stop being used at least indirectly as an abutment for the thrust piece, and the other stop being used at least indirectly as an abutment for the compression spring element.

Sanitary mixing faucets with thermostat device and thermostat cartridges for these mixing faucets with an overtravel unit of the indicated type have been known for a long time. The known overtravel unit with sleeve body, compression spring element, and thrust piece was produced in the past such that first a metal sleeve was edged on one side. Then the thrust piece and the compression spring element were inserted, i.e., pushed into the tubular opening of the sleeve. Then the sleeve was sealed to the top by the other end being edged. Overall the required cost of producing the overtravel unit is relatively large, last but not least due to the edging.

The invention takes a new approach and avoids the aforementioned defects by the sleeve body in the unmounted state of the overtravel unit being hinged and by there being two stops even before insertion of the compression spring element and thrust piece. For the sake of clarity it should be mentioned that the expression "hinged" in this connection means that the sleeve body is made such that the compression spring element and thrust piece can be inserted transversely to the longitudinal axis which passes through the sleeve body into the latter, while in the prior art the two aforementioned components must be pushed into the sleeve body parallel to the longitudinal axis. Because the sleeve body is hinged and due to the stops which are used as abutments for the thrust piece and compression spring element and which are already present in the unmounted state, it is ensured that the double edging of the sleeve body after insertion of the thrust piece and compression spring element is no longer necessary. Without loss of function, but much more cost favorably can the thrust piece and compression spring element now be inserted into the opened sleeve body which is then folded shut or closed.

With regard to simple assembly and also for reasons of production technology, it is advantageous if the sleeve body has at least two preferably identical shells which are made as separate components or which can be joined to one another via a hinge. Insertion of the thrust piece and the compression spring element into the sleeve body then takes place such that the two aforementioned components are first inserted into the shell. Then the other shell is attached; the sleeve body is so-to-speak hinged on. The thrust piece and/or the shells can be produced especially cost-favorably and easily, if they are made of plastic, especially POM.

The invention furthermore relates to a mixing faucet with thermostat device with a thermostat cartridge with a control body located in the cartridge housing, and with a seal located in the groove of the control body, especially a membrane seal.

The disadvantage in the known mixing faucets of the above described type is that the control body can easily fall out of the cartridge housing when not installed. This can make mounting and dismounting difficult. In addition, the control body can be damaged when it falls out of the cartridge housing. This applies especially to the control edges of the control sleeve which belongs to the control body or a flexible element connected to the control sleeve.

The invention takes a new approach and avoids the aforementioned defects by there being a snap ring which can be locked to the cartridge housing for holding the control body in the latter. By means of this measure which appears simple in retrospect, the cartridge housing and the control body form a unit which can be handled jointly and which can be easily, mounted, dismounted, or replaced. The control body is captively held in the cartridge housing without the operation of the control body in the cartridge housing being hindered by the snap ring.

It is especially feasible if the snap ring in the locked state directly or indirectly abuts the seal with the formation of a seal stop. In this case the front face of the snap ring facing the seal should have a bevel. In addition to the retaining function for the control body, the snap ring has an additional sealing function. In general the seal is maintenance-free and in addition it is greaseless.

Furthermore, it is advantageous if there is a ring-shaped screen joined to the snap ring. For the sake of simplicity the screen and the snap ring should be made integral; this is especially recommended when the snap ring and the screen are made of plastic, especially POM.

In addition the invention relates to a mixing faucet with a thermostat device, with a temperature adjustment means which has an adjustment unit, the adjustment unit having a detachable element, a screw element and a rotary element and the detachable element having the capacity to be joined to the cartridge housing of a thermostat cartridge or an extension housing of an extension means which is coupled to the cartridge housing of the thermostat cartridge, with an extension means which has an extension housing for connection of a temperature adjustment means to a thermostat cartridge, for which the extension housing can be connected to the housing of the thermostat cartridge.

In the prior art mounting of an adjustment unit or extension means on the thermostat cartridge housing or mounting of the adjustment unit on the extension housing of the extension means is generally associated with some cost. The same applies to dismounting.

To simplify mounting and dismounting it is provided as claimed in the invention that the adjustment unit can be locked onto the cartridge housing or the extension housing of the extension means or the extension housing can be locked onto the cartridge housing. To achieve not only simple mounting, but also simple dismounting, the locking is effected by a separate bolt. This bolt is made such that it is assigned to the adjustment unit or extension housing, but can be removed or withdrawn from the adjustment unit or extension housing. If this is done, the bolt is withdrawn from the adjustment unit or extension housing, the catch action and also the bolt action are cancelled and the adjustment unit or extension housing can be easily withdrawn.

Structurally the snap-in connection is accomplished via the removable bolt such that in the detachable element or in the extension housing there is a preferably slot-shaped receiver for the bolt and that the receiver has at least one opening which opens into the interior of the detachable element or extension housing and through which a section of the bolt projects into the interior in the inserted state in order to interact in the attached state with a corresponding groove in the cartridge housing or in the extension housing. To achieve uniform and secure locking, the bolt is made U-shaped with two catch arms, while in the detachable element or in the extension housing there are openings on the opposite sides. So that the bolt does not unintentionally drop out of the slot-shaped receiver, it has a fixing section for detachable holding on the detachable or extension housing. The fixing section is then preferably adjacent directly to the catch arm. To be able to easily withdraw the bolt, it has a projecting grip section. In addition, for production reasons, it is feasible, i.e., cost-favorable, to make the bolt out of plastic, especially POM.

So that the detachable element, the screw element and the rotary element can be easily handled as a unit, it is advantageous if the rotary element in which the screw element is accommodated is pivotally held via another separate bolt on the detachable element. The type of interlocking via another bolt can be done similarly to the above described process by means of the bolt. For this reason, on the rotary element there is a roughly slot-shaped receiver for the other bolt, while the receiver has at least one opening which opens into the interior of the rotary element, through which a section of the other bolt projects in the inserted state into the interior to interact with a corresponding, preferably peripheral groove on the detachable element.

The other bolt is also preferably made U-shaped, therefore has two arms, while in the rotary element on the opposite sides there are openings so that there is interlocking on opposite sides. In addition, it is also provided for the other bolt that it has at least one fixing section for detachably holding the other bolt on the rotary element.

Finally, the invention relates to a sanitary mixing faucet with thermostat device with at least one reset means which has at least one other compression spring element and another thrust piece, the other thrust piece being used for interaction with a flexible element of the control body of the mixing faucet with prestress of the other compression spring element.

In particular, in wall-mounted mixing faucets with thermostat devices it is such that there is a valve seat for one control edge of the control body on a housing built into the wall. Problems arise whenever the valve seat is damaged and must be replaced.

The invention takes a new approach and to avoid the aforementioned defects of the prior art calls for a sleeve which holds another compression spring element and another thrust piece, the forward edge of the sleeve being made as a valve seat of one control edge of the control body. Thus the valve seat which is fixed in the housing in the prior art is now on an interchangeable part which can be both mounted and dismounted without problems.

It is recommended that the aforementioned sleeve have other functions. Thus, for example, it can be provided that the sleeve, the other compression spring element and the other thrust piece are made as a unit which can be handled together and thus form the reset device. To produce the reset device made as a structural unit from the aforementioned sleeve, the other compression spring element and the other thrust piece, it is especially feasible if the other thrust piece is locked to the sleeve. In this case the other thrust piece can preferably consist of plastic, especially of POM.

The sleeve is preferably provided with an outside thread so that it can be easily screwed into and then out of a wall installation housing again, especially in a wall-mounted mixing faucet with thermostat device. Furthermore, there should be a seal on the sleeve, specifically in the rear area, so that any sealing problems can be easily solved by replacing the structural unit, therefore with the seal.

Other features, advantages and possible applications of this invention follow from the following description of embodiments using the drawings and from the drawings themselves. Here all described and/or illustrated features either by themselves or in any combination form the subject of this invention, regardless of its summary in the patent claims or reference thereto.

Figure 2:
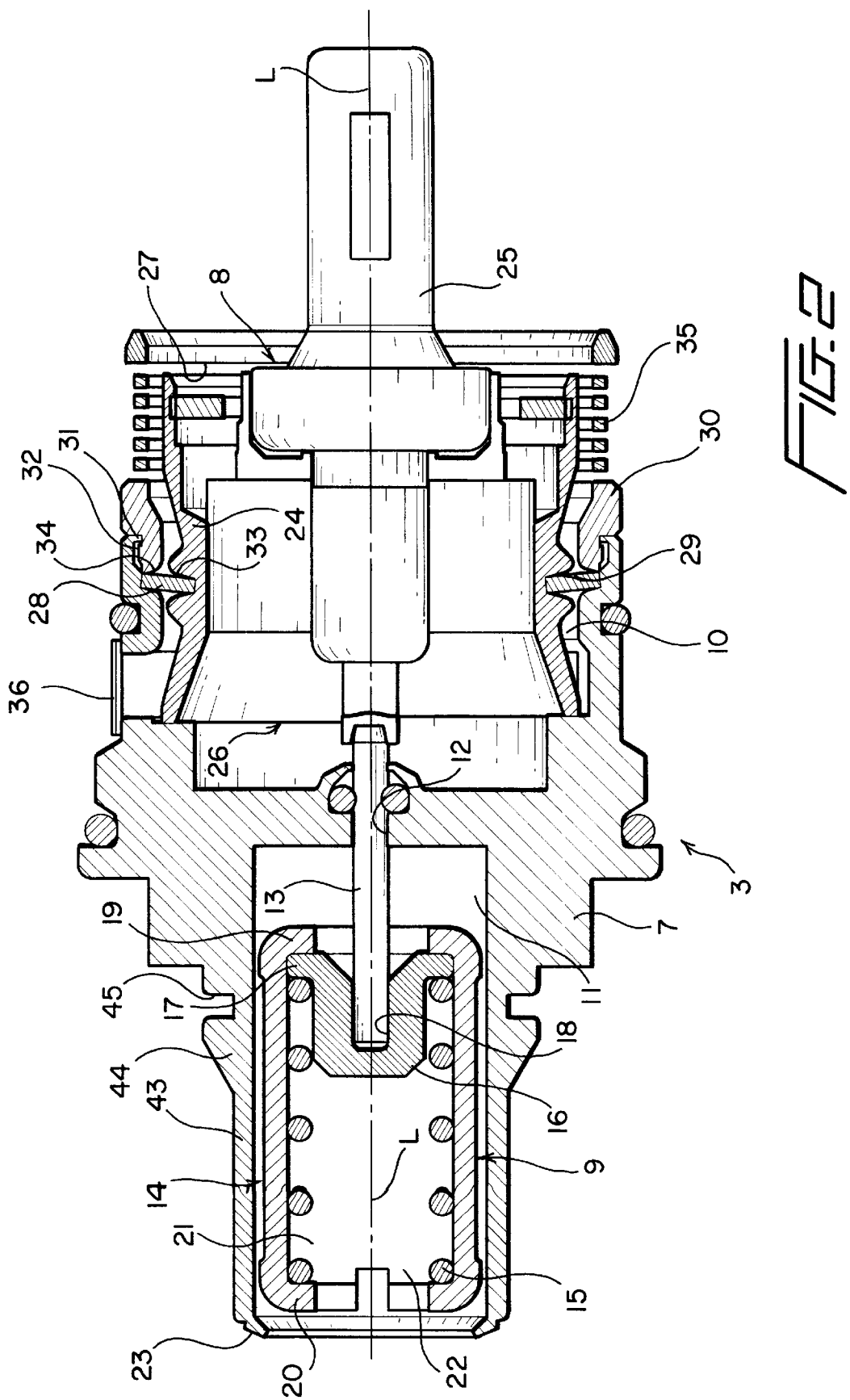
Figure 3:
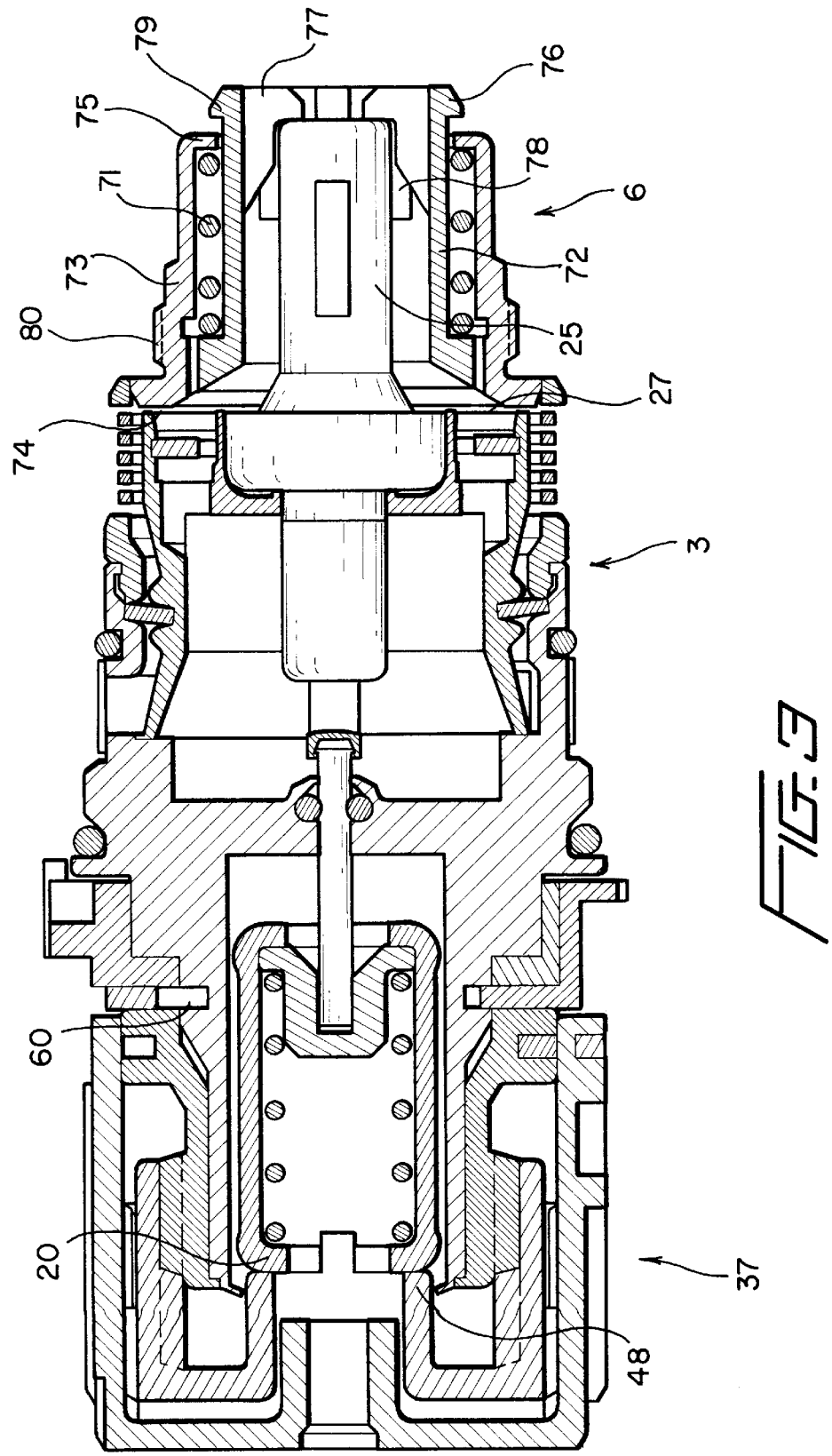

FIG. 1 shows a cross sectional view of a mixing faucet as claimed in the invention with a thermostat device, FIG. 2 shows a cross sectional view of a thermostat cartridge for the mixing faucet as claimed in the invention, FIG. 3 shows a cross sectional view of a thermostat cartridge with an adjustment unit of a temperature adjustment means and the assigned reset means, FIG. 4 shows a cross sectional view of the adjustment unit, FIG. 5 shows an overhead view of a bolt of the adjustment unit, FIG. 6 shows an overhead view of another bolt of the adjustment unit.

FIG. 1 shows sanitary mixing faucet 1 with a thermostat device which is screwed into wall installation housing 2. Sanitary mixing faucet 1 has thermostat cartridge 3, temperature adjustment means 4, extension means 5, and reset means 6.

FIG. 2 details thermostat cartridge 3. Thermostat cartridge 3 has cartridge housing 7 in which on the one hand control body 8, on the other hand overtravel unit 9 are accommodated. For this reason cartridge housing 7 has first larger chamber 10 open to the outside for control body 8, and smaller second chamber 11 for overtravel unit 9. Chambers 10, 11 are joined to one another via sealed opening 12 in which thrust rod 13 is mounted. Thrust rod 13 is joined both to control body 8 and to overtravel unit 9.

Overtravel unit 9 has sleeve body 14, compression spring element 15 and thrust piece 16. Compression spring element 15 which is a helical spring is located together with thrust piece 16 within sleeve body 14. The arrangement is such that compression spring element 15 acts against thrust piece 16. For this reason thrust piece 16 has peripheral edge 17 on which compression spring element 15 rests. Thrust piece 16, which could be made essentially as a plate, has an external journal shape and holds thrust rod 13. For this reason there is corresponding receiver 18 in thrust piece 16. On its two ends sleeve body 14 has one stop 19,20 each as a peripheral stop collar. Here one stop 19 is used as an abutment for thrust piece 16 and other stop 20 is used as an abutment for compression spring element 15.

It is significant that sleeve body 14 in the unmounted state, when it is therefore not located in chamber 11, is "hinged". "Hinged" means in this connection that compression spring element 15 and also thrust piece 16 can be inserted into sleeve body 14 roughly transversely to the longitudinal axis of overtravel unit 9. It is furthermore important that in the unmounted state and also in the original state there are two stops 19, 20, so that the two processes of edging sleeve body 14 on its two ends which are necessary in the prior art are no longer necessary.

Sleeve body 14 in this embodiment consists of two identical shells 21, 22. Since shells 21, 22 are not only identical in construction, but represent two separate parts, the aforementioned term "hinged" also means that one shell can be removed from the other so that the interior of sleeve body 14 which is bordered by stops 19, 20 is freely accessible for insertion of compression spring element 15 and thrust piece 16. Thrust piece 16 and shells 21, 22 consist of plastic, especially of POM.

After assembling overtravel unit 9 and inserting it into chamber 11, front peripheral edge 23 is beaded on chamber 11 to the inside such that overtravel unit 9 is secured in chamber 11 and cannot be pressed out.

Aforementioned control body 8 has control sleeve 24 and thermostatic capsule 25, thermostatic capsule 25 being attached to control sleeve 24. Control sleeve 24 itself has on its ends one control edge 26, 27 each for control of flow of hot and cold water. On the outside of control sleeve 24 of control body 8 is peripheral membrane seal 28. Membrane seal 28 is located in V-shaped groove 29 of control sleeve 24 and separates the hot water region from the cold water region.

It is significant that there is snap ring 30 which can be locked to cartridge housing 7 and which is used to hold control body 8 in cartridge housing 7, i.e., in chamber 10. For this reason cartridge housing 7 on the opening side in chamber 10 has preferably peripheral edge 31 which projects to the inside, while on snap ring 30 there is at least one catch projection 32 with conventional inclined contact surface. The catch connection between cartridge housing 7 and snap ring 30 is such that after locking of snap ring 30 it is held essentially without play on cartridge housing 7, i.e., it cannot move by itself in the direction of longitudinal axis L. Here snap ring 30 in the locked state abuts membrane seal 28 with formation of a seal stop. Snap ring 30 therefore provides not only for cartridge housing 7 and control body 8 forming a unit which can be handled together, but also for its being used to accomplish the seal between the two parts. In order not to limit the motion of membrane seal 28 and in order to make available another V-shaped groove for membrane seal 28, front edge 33 facing membrane seal 28 has bevel 34.

Furthermore, ring-shaped screen 35 is joined to snap ring 30 and extends over control edge 27 of control sleeve 24. But otherwise control edge 26 is preceded by screen 36 which is joined to cartridge housing 7. In contrast to screen 36, screen 35 is made integrally with snap ring 30. The entire unit of snap ring 30 and screen 35 consists of plastic, especially POM.

FIG. 3 shows thermostat cartridge 3 shown in FIG. 2 together with adjustment unit 37 of temperature adjustment means 4 and reset means 6. The details of adjustment unit 37 are especially apparent in FIG. 4. Adjustment unit 37 has detachable element 38, screw element 39 and rotary element 40. Detachable element 38 is made such that in the assembled state it can be seated on cartridge housing 7 or extension means 5 without the possibility of twisting or being removed. For this reason, in inner area 41 of detachable element 38 there are fixing means 42 which correspond to the corresponding fixing means not shown on cartridge housing 7. In this embodiment the fixing means on detachable element 38 are sawtoothed projections. Inner area 41 itself is matched roughly to the shape of the area of cartridge housing 7 on which detachable element 38 is placed. For this reason on cartridge housing 7 is neck 43 which has peripheral cone 44. There is peripheral groove 45 adjoining cone 44.

On its upper end facing away form cartridge housing 7 detachable element 38 has outside thread 46 which corresponds to inner thread 47 in screw element 39. Furthermore, screw element 39 has central opening 49 which is provided with peripheral edge 48 which projects to the inside. In addition, on the outside on screw element 39 there are elongated guide projections 50 which are aligned roughly in the direction of longitudinal axis L of adjustment unit 37 and which correspond to corresponding guide projections 51 on the inside of rotary element 40. Rotary element 40 is provided with edge 53 which has central opening 52, which projects to the inside, and which can project into opening 49. This means that the outside dimensions of edge 53 are slightly less than the inside dimensions of opening 49.

It is significant here that adjustment unit 37 preferably as a structural unit can be locked onto cartridge housing 7 or extension housing 54 of extension means 5. If extension housing 54 is used, as is shown in FIG. 1, it goes without saying that extension housing 54 on its end facing away from cartridge housing 7 corresponds to the external shape of the corresponding end of cartridge housing 7.

The same interlocking principle also applies when extension means 5 is joined to cartridge housing 7. This is shown in FIG. 1.

Extension means 5 itself, as FIG. 1 shows, consists simply of extension housing 54 and movable transfer element 55 which is located therein and which joins adjustment unit 37 to overtravel unit 9. For this reason, on transfer element 55 there is first edge 56 which is joined to edge 48 of screw element 39, while other edge 57 is joined to stop 20. In this way rotary motion of rotary element 40 can be transferred via screw element 39, transfer element 55, overtravel element 9, and thrust rod 13 to control element 8 for temperature adjustment.

For clarification it is pointed out that in the embodiment shown in FIG. 3, edge 48 is directly joined to stop 20, therefore there is no extension means 5. Regardless of whether adjustment unit 37 can now be locked onto cartridge housing 7 itself or onto extension housing 54 and whether in addition extension housing 54 can be locked onto cartridge housing 7, it is provided in both embodiments that locking and thus detachable mounting are effected by separate bolt 58 which is detailed in FIG. 5. Providing separate bolt 58 has the advantage that the locking can be released especially easily; this however is not possible, in any case without the danger of damage to the catch elements, if the elements which cause the locking are not accessible or detachable from the outside.

In detachable element 38 or in extension housing 54 there is slotted receiver 59 for bolt 58. To be able to develop the lock and bolt action, receiver 59 has two openings 60 which are located on opposite sides and which extend into interior 41 of detachable element 38 or extension housing 54. One section of bolt 58 projects through each of openings 60 in order to interact with groove 45 in cartridge housing 7 or in extension housing 54. Bolt 58 itself is made U-shaped and has two catch arms 61, 62 opposite one another. Fixing section 63 which is used for detachable holding of bolt 58 on detachable element 38 or extension housing 54 adjoins catch arm 61. Furthermore, bolt 58 has grip section 64 which is used for easy removal of bolt 58. Bolt 58 incidentally consists of plastic, especially POM.

So that adjustment unit 37 can be handled as one structural unit, rotary element 40 is secured to pivot on detachable element 38 via another separate bolt 65. Bolt 65 secures not only rotary element 40 on detachable element 38, but also limits the motion of screw element 39 within rotary element 40. If there were no bolt 65, rotary element 40 could be unscrewed from detachable element 38.

As follows especially from FIG. 4, in rotary element 40 is slotted receiver 66 for additional bolt 65, receiver 66 having two openings 67 which open into the interior of rotary element 40 and through which one section of other bolt 65 projects in the inserted state into the interior. These sections of additional bolt 65 which project into the interior interact with corresponding peripheral groove 68 on detachable element 38.

As follows especially from FIG. 6, other bolt 65 is likewise made U-shaped; it therefore has two arms 69, 70. On each of two arms 69, 70 bolt 65 has fixing section 71' which points to the outside. Fixing sections 71' are used for detachable holding of additional bolt 65 on rotary element 40 or in receiver 66.

FIG. 3 details reset means 6, as already mentioned, while it is visible in FIG. 1 in the installed state of mixing faucet 1. Reset means 6 which is shown in FIGS. 1 and 3 in the prestressed position has another compression spring element 71 which is a helical compression spring, and another thrust piece 72. Additional thrust piece 72 is used for interaction with thermostatic capsule 25 of control body 8.

Here it is important that sleeve holding 73 which holds additional compression spring element 71 and additional thrust piece 72 is provided as a separate part. Front edge 74 of sleeve holding 73 is made as a valve seat of control edge 27 of control sleeve holding 24. Overall, sleeve holding 73, additional compression spring element 71, and additional thrust piece 72 are made as a structural unit, therefore they can be handled together. For this reason additional thrust piece 72 is locked to sleeve holding 73. The arrangement of additional compression spring element 71 and additional thrust piece 72 in sleeve holding 73 is such that sleeve holding 73 on its end facing away from control body 8 has preferably peripheral stop 75 which is pointed to the inside. On the inside, additional compression spring element 71 rests against stop 75. Additional thrust piece 72 is pushed through additional compression spring element 71 and is locked behind stop 75. For locking there is at least one catch projection 76 on the outside on additional thrust piece 72.

Additional thrust piece 72 likewise has a sleeve-like shape and on the end side forms stop 77 for thermostatic capsule 25. In this embodiment the area which forms stop 77 is formed by a total of four arms 79 which are spaced apart from one another via one slot 78 each. Additional thrust piece 72 consists preferably of plastic, especially POM.

On the outside, sleeve holding 73 has outside thread 80 which corresponds to a corresponding inner thread in wall installation housing 2. Furthermore, in the rear area of sleeve holding 73 seal 81 is mounted.

Sanitary mixing faucet 1 shown in FIG. 1 with a thermostat device can be easily installed. First, reset means 6 is screwed into wall installation housing 2. Then thermostat cartridge 3 is screwed into wall installation housing 2 with control body 8 fixed via snap ring 30. Then extension means 5 can be pushed onto neck 43 of cartridge housing 7, bolt 58 engaging groove 45 after movement via cone 44. Then adjustment unit 37 can be pushed onto the neck of extension housing 45 in the same way until bolt 58 engages.

I claim:

1. Sanitary mixing faucet with a thermostat device, with thermostat cartridge which has an overtravel unit, said overtravel unit having a sleeve body, at least one compression spring element and at least one thrust piece against which the compression spring element acts, the sleeve body, in the area of its two ends, having one stop each, and one stop being used at least indirectly as an abutment for a thrust piece, and the other stop being used at least indirectly as an abutment for the compression spring element, characterized in that the sleeve body is of parts that are split and spreadable to an extent enabling, in the unmounted state of the overtravel unit, insertion of the thrust piece and spring element into the sleeve body transversely to a longitudinal axis passing through the sleeve body, and the two stops are present before insertion of the compression spring element and thrust piece.

2. Mixing faucet as claimed in claim 1, wherein the sleeve body has at least two preferably identical shells.

3. Mixing faucet as claimed in claim 2, wherein the thrust piece and/or shells are made of plastic.

4. Mixing faucet as claimed in claim 2, wherein said shells are made as separate components.

5. Mixing faucet as claimed in claim 2 wherein said shells are connected to one another via a hinge.

6. Mixing faucet as claimed in claim 3, wherein said plastic is POM.

7. Sanitary mixing faucet with a thermostat device, with a thermostat cartridge with a control body located in a cartridge housing, and with a seal located in a groove of the control body; wherein there is snap ring which can be locked to the cartridge housing for holding the control body in the cartridge housing; and wherein the snap ring in the locked state directly or indirectly adjoins the seal with formation of a seal stop.

8. Mixing faucet as claimed in claim 7, wherein a face of the snap ring facing the seal has a bevel.

9. Mixing faucet as claimed in claim 7, wherein a ring-shaped screen is joined to the snap ring.

10. Sanitary mixing faucet as claimed in claim 7, wherein said seal is a membrane seal.

11. Sanitary mixing faucet as claimed in claim 7, wherein thermostat cartridge has an overtravel unit, said overtravel unit having a sleeve body, at least one compression spring element and at least one thrust piece against which the compression spring element acts, the sleeve body has a stop in the area of each its two ends, and one stop being used at least indirectly as an abutment for a thrust piece, and the other stop being used at least indirectly as an abutment for the compression spring element, characterized in that the sleeve body is constructed in a manner enabling, in the unmounted state of the overtravel unit, insertion of the thrust piece and spring element into the sleeve body transversely to a longitudinal axis passing through the sleeve body, and the two stops are present before insertion of the compression spring element and thrust piece.

12. Sanitary mixing faucet as claimed in claim 9, wherein the snap ring and screen are made in one piece of a plastic material.

13. Sanitary mixing faucet as claimed in claim 12, wherein said plastic material is POM.

14. Sanitary mixing faucet with a thermostat device, with a temperature adjustment means which has an adjustment unit, said adjustment unit having a detachable element, a screw element and a rotary element, and the detachable element having the capacity to be joined to a cartridge housing of a thermostat cartridge or extension housing of an extension means which is coupled to the cartridge housing of the thermostat cartridge, wherein the adjustment unit can be locked onto the cartridge housing or extension housing of the extension means.

15. Mixing faucet as claimed in claim 14, wherein the adjustment unit is made as a unit which can be handled separately, and wherein the rotary element is secured to pivot on the detachable element.

16. Mixing faucet as claimed in claim 15, wherein the additional bolt is made U-shaped and has two catch arms.

17. Sanitary mixing faucet as claimed in claim 16, wherein there are openings on opposite sides of the rotary element; and wherein the additional bolt has at least one fixing section for detachable holding of the additional bolt on the rotary element.

18. Sanitary mixing faucet as claimed in claim 14, wherein the adjustment unit is lockable onto the cartridge housing or extension housing by means of a separate bolt.

19. Mixing faucet as claimed in claim 18, wherein, in the detachable element or in the extension housing, there is a receiver for the bolt; and wherein the receiver has at least one opening which opens into the interior of the detachable element or extension housing through which one section of the bolt projects, in the inserted state, into the interior in order to interact, in the inserted state, with a corresponding groove in the cartridge housing or in the extension housing.

20. Sanitary mixing faucet as claimed in claim 19, wherein the receiver is slotted and the groove is a peripheral groove in the cartridge housing or in the extension housing.

21. Mixing faucet as claimed in 19, wherein the bolt itself is made U-shaped.

22. Sanitary mixing faucet as claimed in claim 21, wherein the bolt has two catch arms and on opposite sides has openings which open into the detachable element or the extension housing.

23. Mixing faucet as claimed in claim 19, wherein the bolt has a fixing section for detachable holding of the bolt in the inserted state on the detachable element or on the extension housing, wherein the fixing section.

24. Sanitary mixing faucet as claimed in claim 23, wherein the fixing section adjoins one catch arm; wherein the bolt has a projecting grip section and wherein the bolt is made of plastic.

25. Sanitary mixing faucet as claimed in claim 15, wherein the rotary element is secured to pivot on the detachable element via another separate bolt.

26. Mixing faucet as claimed in claim 25, wherein, in the detachable element, there is a receiver for the additional bolt, and wherein the receiver has at least one opening which opens into the interior of the rotary element, through which a section of the additional bolt projects, in the inserted state, into the interior in order to interact with a corresponding groove on the detachable element.

27. Sanitary mixing faucet with a thermostat device, with an extension means which has an extension housing for connection of a temperature adjustment means to a thermostat cartridge, in which the extension housing can be connected to a cartridge housing of the thermostat cartridge; wherein the extension housing can be locked onto cartridge housing.

28. Sanitary mixing faucet as claimed in claim 27, wherein the extension housing is lockable onto the cartridge housing by means of a separate bolt.

29. Sanitary mixing faucet with a thermostat device with thermostat cartridge which has a cartridge housing containing an overtravel unit, said overtravel unit having a sleeve body, at least one compression spring element and at least one thrust piece against which the compression spring element acts, the sleeve body having a stop in the area of each of its two ends, one stop being used at least indirectly as an abutment for a thrust piece, and the other stop being used at least indirectly as an abutment for the compression spring element, with a reset means which has at least another compression spring element and another thrust piece, the additional thrust piece being used for interaction with a thermostatic capsule of a control body that is located in the cartridge housing of the mixing faucet with prestressing of the additional compression spring element; wherein a holding sleeve holds the additional compression spring element and additional thrust piece and is provided as a separately replaceable part relative to the cartridge housing; and wherein a front edge of said holding sleeve is made as a valve seat of one control edge of a control sleeve of the control body.

30. Mixing battery as claimed in claim 29, wherein the holding sleeve, additional compression spring element and additional thrust piece (72) are made as a unit which can be handled separately.

31. Mixing battery as claimed in claim 30, wherein holding sleeve has an outside thread.

32. Sanitary mixing faucet as claimed in claim 30, wherein the additional thrust piece is locked to the holding sleeve.

33. Sanitary mixing faucet as claimed in claim 31, wherein a seal is mounted on the holding sleeve in a rear area thereof.

* * * * *